No. 625,358. Patented May 23, 1899.
G. SCHOCK.
GRAIN DRIER.
(Application filed July 16, 1898.)
(No Model.) 4 Sheets—Sheet 1.
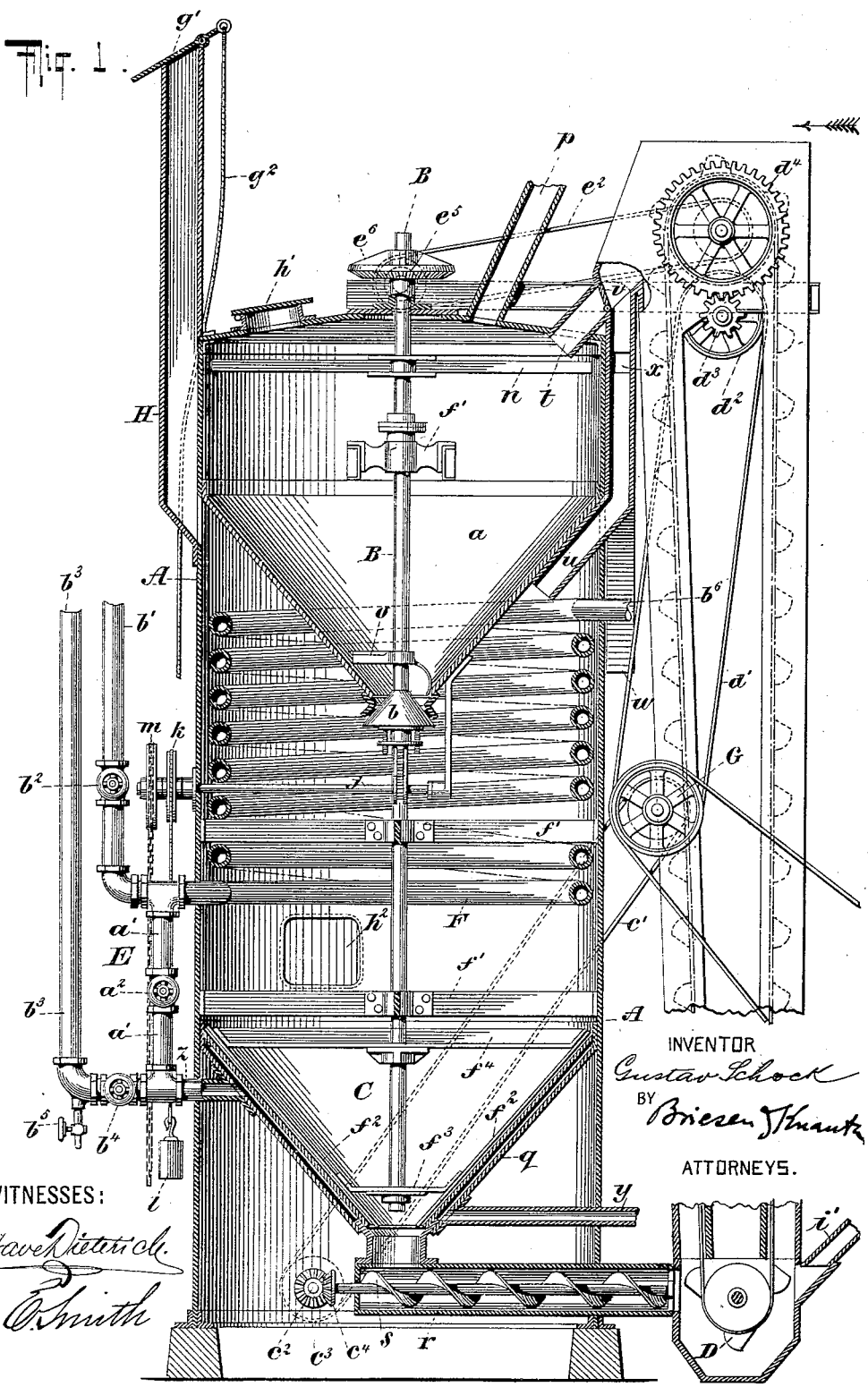

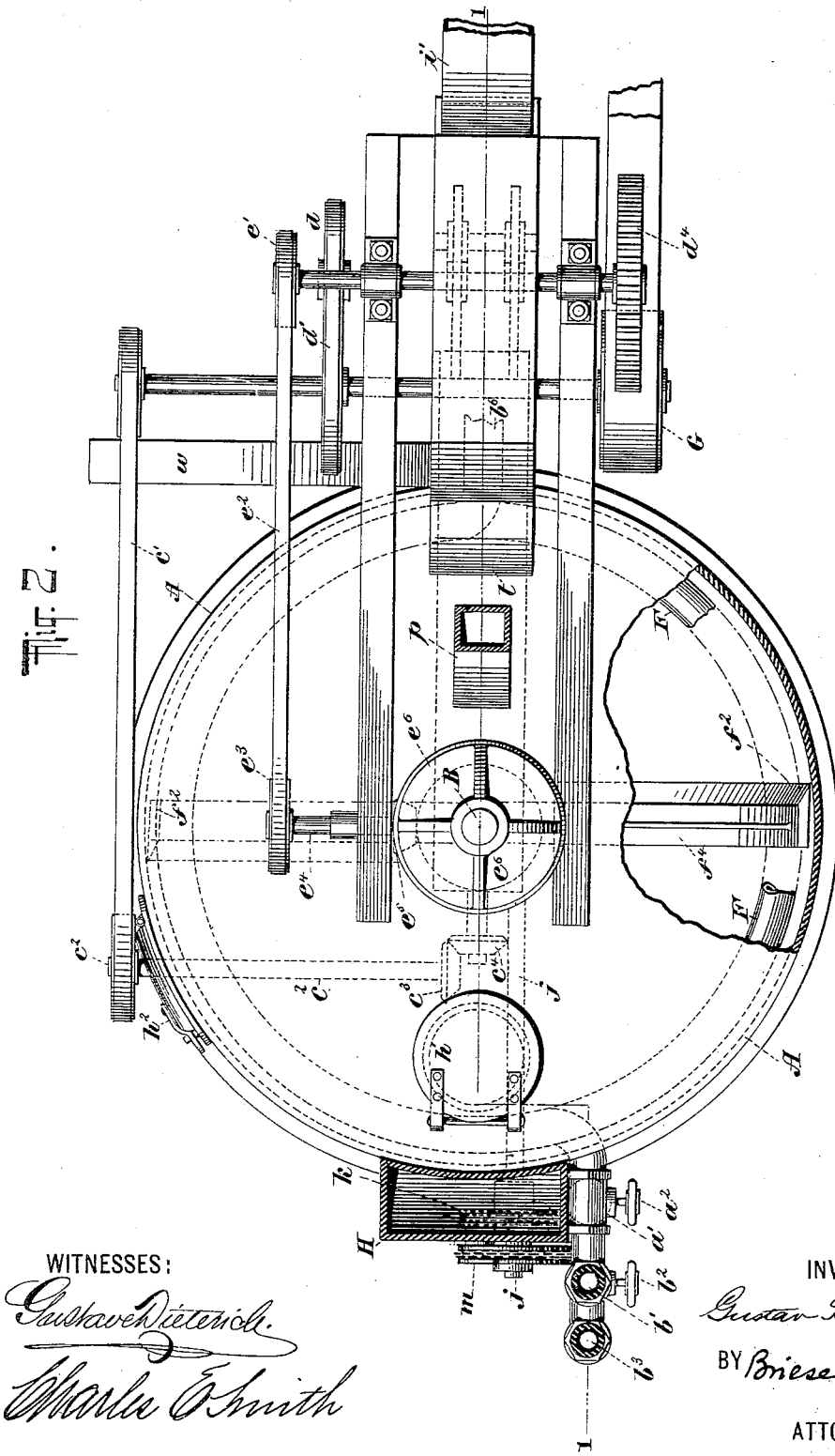

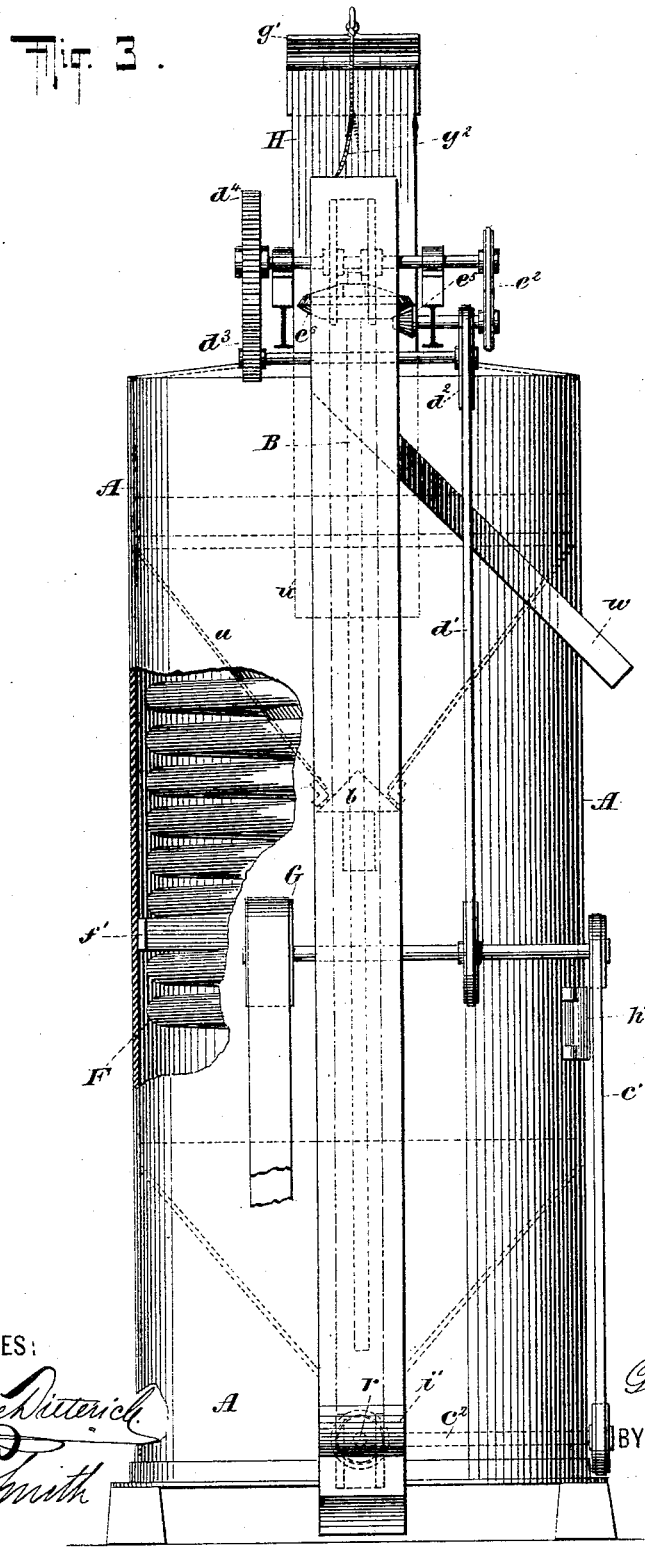

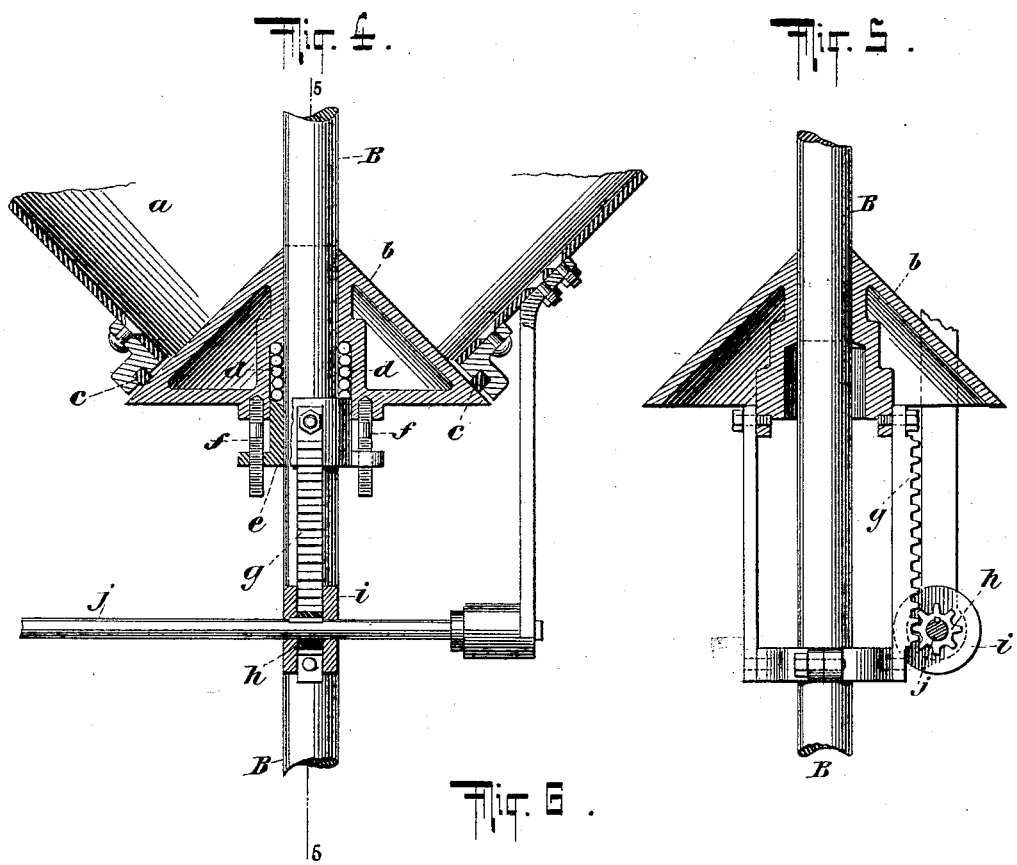

UNITED STATES PATENT OFFICE.

GUSTAV SCHOCK, OF NEW YORK, N. Y.

GRAIN-DRIER.

SPECIFICATION forming part of Letters Patent No. 625,358, dated May 23, 1899.

Application filed July 16, 1898. Serial No. 686,094. (No model.)

*To all whom it may concern:*

Be it known that I, GUSTAV SCHOCK, residing in the city of New York, borough of Manhattan, county and State of New York, have invented certain new and useful Improvements in Grain-Driers, of which the following is a full, clear, and exact description.

My invention relates to grain-driers; and the object of said invention is to provide a simple and efficient grain-drier which can be operated economically and wherein there is little liability of the parts getting out of order or of the feed of the material being impeded.

To these ends my invention consists in the novel arrangement and combination of parts hereinafter claimed, reference being had to the accompanying drawings for a fuller disclosure thereof.

In the drawings, which show one embodiment of my invention and wherein like characters represent corresponding parts in the various views, Figure 1 is a vertical sectional view of the apparatus on the line 1 1 of Fig. 2. Fig. 2 is a plan sectional view of the same, the section cutting through the chimney or outlet. Fig. 3 is a side view of the apparatus, looking in the direction of the arrow in Fig. 1, with parts of the shell broken away to better illustrate the interior construction. Fig. 4 is an enlarged detail vertical sectional view of the lower end of the receiving-hopper and the valve which controls the outlet thereof, the section being taken on the line 4 4, Fig. 6. Fig. 5 is an enlarged detail vertical sectional view of the valve, taken on the line 5 5 of Fig. 4. Fig. 6 is a bottom view of the same.

The main shell or casing A of the drier is preferably made of sheet metal. Within this shell is contained a receiving-hopper $a$, which is located at the upper portion of the shell and is preferably of frusto-conical form. At the lower end of this hopper is a discharge-opening which may be closed by a valve $b$, preferably of frusto-conical form, which is adapted to bear against a packing-ring $c$, carried by the receiving-hopper. This valve $b$ is preferably cast in a single piece, with a space for the packing-rings $d$, (see Fig. 4,) which are held in place by a gland $e$, which is connected to the valve by screws $f$. Depending from the gland $e$ is a rack $g$, which is engaged by a pinion $h$, which is provided on each side with a flange $i$, that embraces the rack and prevents the valve from turning with the shaft B. The pinion $h$ is carried by shaft $j$, which has connected therewith a pulley $k$, (see Fig. 1,) to which is secured a band or rope, to the other end of which is connected a weight $l$. This weight normally maintains the valve in position against the valve-seat formed by the packing-ring $c$. A chain-wheel $m$ is likewise connected to the shaft $j$, and the endless chain, which engages this chain-wheel, may be used to unseat the valve when the contents of the receiving-hopper are to be discharged. The shaft B is provided with stirrer-arms $n$ $o$, which operate within the receiving-hopper. The grain or other material to be treated may be introduced into the receiving-hopper through an inlet-chute $p$. Below the receiving-hopper $a$ and within the shell is contained a drying-hopper C, which is preferably of frusto-conical form. Surrounding this hopper C is a shell $q$, between which and the hopper proper is formed a steam-space, so that in effect a steam-jacket is formed which surrounds the drying-hopper. The lower end of the hopper C connects with an outlet-channel $r$, in which is contained a feed-worm $s$. This worm conveys the material treated from the drying-hopper to a conveyer D at the outside of the shell, where the material is elevated to the upper portion of the apparatus, where it may be again conveyed to the receiving-hopper through a chute $t$, or it may be conveyed to the drying-hopper through a chute $u$ without passing through the receiving-hopper. The passage of the material through either of the chutes $t$ $u$ is effected by a valve $v$, which when in the position illustrated in Fig. 1 will close the chute $t$ and open the chute $u$ and cause the material to be conveyed through the chute $u$. After the material has been sufficiently dried it may be discharged from the apparatus through a chute $w$, which is controlled by a valve $x$ in the chute $u$. In order to accomplish this discharge of the dried material from the apparatus, it is merely necessary to set the valve $v$ in the position shown in Fig. 1 and to shift the valve $x$ to a position where it will extend across the chute $u$ and will at the same time open the mouth of the chute $w$. Exhaust-steam may be introduced into the steam-jacket surrounding the hopper C through a pipe $y$, and the pipe $z$ constitutes an outlet for the steam from the said steam-jacket. Connected with the outlet-pipe $z$ of the steam-jacket are pipe connections E, which communicate with a steam-coil F, contained within the shell between the receiving and drying hoppers and which extend around the shell adjacent to the walls thereof. These pipe connections comprise a pipe $a'$, in which is located a valve $a^2$, that controls the passage of steam between the steam-coil and its connections and the steam-jacket surrounding the drying-hopper. A live-steam inlet $b'$ is connected to the steam-coil and to the pipe $a'$ and is controlled by a valve $b^2$. An exhaust-steam outlet $b^3$ is likewise connected to the pipe $a'$, and this outlet is controlled by a valve $b^4$, and a drip-valve $b^5$ may be connected therewith, as shown in Fig. 1. By these means exhaust-steam may be introduced through the pipe $y$ and will pass through the steam-jacket surrounding the hopper C, and if the valves $b^4$ and $b^2$ be closed and the valve $a^2$ be opened the exhaust-steam will pass from the steam-jacket through the pipes $a'$ to the steam-coil and off through the outlet $b^6$. If, however, it be found that the exhaust-steam is insufficient to maintain the drier at the proper temperature, live steam may be introduced through the pipe $b'$ to the steam-coil. This is effected in the following manner: The valve $a^2$ is closed and the valve $b^2$ is opened, so as to permit live steam to pass through the pipe $b'$ into the steam-coil. The valve $b^4$ is at the same time opened and the exhaust-steam passing through the inlet-pipe $y'$ will pass through the steam-jacket and out through the steam-outlet $b^3$. It will be observed that by these means both live and exhaust steam may be utilized, as desired.

The various working parts of the apparatus are driven or operated from a main pulley G, upon the shaft of which (see Fig. 2) are carried pulleys that are connected by belts with the parts to be operated. Thus the belt $c'$ connects with a pulley at the lower portion of the apparatus, and a shaft $c^2$, which carries this pulley, extends into the shell A and carries a bevel-gear $c^3$, which meshes with a bevel-gear $c^4$ upon the inner end of the shaft of the worm $s$, and in this manner operates the worm to discharge the material to the conveyer. The conveyer itself is operated by a belt $d'$, which rotates a pulley $d^2$, on the shaft of which is carried a pinion $d^3$, which pinion meshes with a gear $d^4$, the shaft of which carries the power-transmitting drum of the conveyer. On this same shaft which carries the gear-wheel $d^4$ is carried a pulley $e'$, (see Fig. 2,) to which is connected a driving-belt $e^2$, that operates a pulley $e^3$, by which means a shaft $e^4$ is rotated to operate a bevel-gear $e^5$. This bevel-gear $e^5$ coöperates with a bevel-gear $e^6$, which is carried by the shaft B, which is properly supported in place by braces or arms $f'$ and which, in addition to the stirrer-arms $n\ o$, hereinbefore mentioned, carries scraper-blades $f^2$, which are supported in place by arms or braces $f^3\ f^4$ and are adapted to remove any of the grain or other material which may adhere to the wall of the drying-hopper C. The heated air which passes to the upper portion of the shell is carried off through an outlet or chimney H, which may be provided with a trap $g'$, the weight of which will normally maintain it closed, but which may be opened to the desired extent by a rope or other adjusting means $g^2$. A manhole $h'$ may be provided by which access to the interior of the receiving-hopper may be had, and access to the steam-coils and the drying-hopper may be had through the door $h^2$. The initial charge of material may be introduced into the receiving-hopper through the inlet-chute $p$ or to the conveyer through an inlet-chute $i'$, which connects with the conveyer, or the initial charge may be otherwise introduced into the apparatus.

It will be observed that by my invention none of the working parts are contained within the drier except the mechanism which operates the worm $s$, and this mechanism is contained at the lower portion of the casing, where the least heat exists, and that therefore the heat has little effect upon the working parts. It will likewise be observed that the interior of the drier proper is free from obstruction by these working parts, and should the necessity arise for repairing them the repairs can be made with little difficulty. Furthermore, there is little waste of heat in the construction forming the subject-matter of my invention. The heated air arising in the steam-jacket contacts with the walls of the receiving-hopper before it passes to the outlet, so that this hopper is heated by this means as well as by the heat which radiates from the steam-coil.

The operation of the apparatus is as follows: The material to be treated is preferably introduced into the apparatus through either of the receiving-chutes $i'$ or $p$. If it is introduced through the chute $i'$, the material is carried by the conveyer to the upper portion of the apparatus and delivered at the junction of chutes $t$ and $u$. The valve $v$ having been set to close the chute $u$, the material will pass through the chute $t$ into the receiving-hopper, where the stirrer-arms $n\ o$ will agitate it and the valve $b$ will prevent the material from escaping until a considerable quantity has been received within the receiving-hopper $a$. Any moisture which collects at the bottom of the hopper may be carried off by a suitable pipe. (Not shown.) After the material has received a preliminary drying in the receiving-hopper $a$ the valve $b$ is opened and the material is discharged into the drying-hopper C, where it is further dried and is conveyed by the worm $s$ to the conveyer. It will be seen that the frusto-conical form of both the receiving and drying hoppers, when taken in combination with the stirrer-arms and scraper-blades, materially facilitates the ready flow of the material and the constant automatic operation of the apparatus and that there is little liability of the apparatus becoming choked during operation thereof. After the material has been carried to the conveyer it may be again discharged into the receiving-hopper, and so on the operation is repeated until the material is sufficiently dried, when by shifting the valve $v$ to the position illustrated in Fig. 1 and shifting the valve $x$ to close chute $u$ and open chute $w$ the dried material may be discharged through the chute $w$. If it be found that the material contained within the receiving-hopper does not flow therethrough as rapidly as it is conveyed thereto by the conveyer and that there would therefore be a liability of the apparatus choking, the material can be conveyed to the drying-hopper through the chute $u$ without passing through the receiving-hopper in a manner which has been hereinbefore described, or it may be found desirable for other reasons to pass the material through the chute $u$ only and hopper C instead of repassing it through the receiving-hopper $a$ after the initial drying.

Having described my invention, what I claim, and desire to secure by Letters Patent, is—

1. In a drier especially adapted for the drying of grain, the combination of a shell, a plurality of superposed hoppers provided with heating devices, an inlet for live steam to the heating devices of one of the hoppers and an inlet for exhaust-steam to the heating devices of the other hopper, means of exit for the steam, a pipe E connecting the live and exhaust steam systems and provided with a suitable valve and means for controlling the flow of the exhaust and live steam whereby the heating systems may both be supplied with live steam or with exhaust-steam or one system supplied with live steam and the other with exhaust-steam, substantially as described and for the purpose set forth.

2. In a device especially adapted for drying grain, the combination of a plurality of superposed hoppers, a heating-coil located beneath the upper hopper and adapted to indirectly heat the same, a steam-jacket surrounding the lower hopper and adapted to directly heat the same, means for elevating material from the lower hopper and delivering it to either hopper at will and a live-steam-supply pipe and an exhaust-steam-supply pipe with suitable outlets and a connecting-pipe E intervening between the heating-coil for the upper hopper and the steam-jacket and provided with a suitable valve whereby either the steam-jacket or the heating-coil may be supplied with live or exhaust steam, as desired.

3. In a drier, the combination of a main shell, a drying-hopper contained within said shell, a steam-jacket surrounding said drying-hopper, a receiving-hopper contained within said shell and adapted to discharge its contents into the drying-hopper, a steam-coil within the shell below the receiving-hopper, connections between the steam-jacket and the steam-coil, an exhaust-steam inlet communicating with the steam-jacket and means for controlling the passage of steam from the steam-jacket to the steam-coil or to an outlet, as desired.

4. In a drier, the combination of a main shell, a drying-hopper contained within said shell, a steam-jacket surrounding said drying-hopper, a receiving-hopper contained within said shell and adapted to discharge its contents into the drying-hopper, a steam-coil within the shell beneath the receiving-hopper, connections between the steam-jacket and the steam-coil, an exhaust-steam inlet communicating with the steam-jacket, means for controlling the passage of steam from the steam-jacket to the steam-coil or to an outlet, as desired, a live-steam-inlet pipe in communication with said connections and means for controlling the passage of live steam through said connections, whereby either live steam or exhaust-steam, or both, can be utilized at will.

5. In a drier, the combination of a main shell, a drying-hopper contained therein, a steam-jacket surrounding said drying-hopper, scraper-blades operating in the drying-hopper, a receiving-hopper adapted to discharge its contents into the drying-hopper, a valve for controlling the outlet of said receiving-hopper, means for controlling said valve from the outside of the shell, stirrer-arms operating in the receiving-hopper, a steam-coil contained within the shell between the receiving and drying hoppers, connections between the steam-jacket and steam-coil, an exhaust-steam inlet communicating with the steam-jacket, means for controlling the passage of steam from the steam-jacket to the steam-coil or to an outlet, as desired, a live-steam-inlet pipe in communication with the connections and means for controlling the passage of live steam through said connections, whereby either live steam or exhaust-steam or both can be utilized at will.

6. In a drier, the combination of a main shell, a drying-hopper contained therein, a steam-jacket surrounding said drying-hopper, scraper-blades operating in the drying-hopper, a receiving-hopper adapted to discharge its contents into the drying-hopper, a valve for controlling the outlet of said receiving-hopper, means for controlling said valve from the outside of the shell, stirrer-arms operating in the receiving-hopper, means for conveying the material treated from the drying-hopper to the outside of the shell and to a point of discharge or back again to the receiving-hopper or directly back to the drying-hopper, as desired, a steam-coil contained within the shell between the receiving and drying hoppers, connections between the steam-jacket and the steam-coil, an exhaust-steam inlet communicating with the steam-jacket, means for controlling the passage of steam from the steam-jacket to the steam-coil or to an outlet, as desired, a live-steam-inlet pipe in communication with the connections and means for controlling the passage of live steam through said connections, whereby either live steam or exhaust-steam or both can be utilized at will.

GUSTAV SCHOCK.

Witnesses:
 CHARLES E. SMITH,
 MAURICE LÉON.